US010027400B2

(12) United States Patent
Mohamad et al.

(10) Patent No.: US 10,027,400 B2
(45) Date of Patent: Jul. 17, 2018

(54) METHOD FOR TRANSMITTING A DIGITAL SIGNAL FOR A MARC SYSTEM HAVING A DYNAMIC HALF-DUPLEX RELAY, CORRESPONDING PROGRAM PRODUCT AND RELAY DEVICE

(71) Applicant: Orange, Paris (FR)

(72) Inventors: Abdulaziz Mohamad, Gif sur Yvette (FR); Raphael Visoz, Vanves (FR); Antoine Berthet, Chatenay Malabry (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/106,711

(22) PCT Filed: Dec. 18, 2014

(86) PCT No.: PCT/FR2014/053432
§ 371 (c)(1),
(2) Date: Jun. 20, 2016

(87) PCT Pub. No.: WO2015/092302
PCT Pub. Date: Jun. 25, 2015

(65) Prior Publication Data
US 2016/0337075 A1 Nov. 17, 2016

(30) Foreign Application Priority Data

Dec. 20, 2013 (FR) ...................................... 1363306

(51) Int. Cl.
*H04B 7/155* (2006.01)
*H04L 1/00* (2006.01)
(Continued)

(52) U.S. Cl.
CPC ......... *H04B 7/15521* (2013.01); *H04L 1/004* (2013.01); *H04L 1/005* (2013.01);
(Continued)

(58) Field of Classification Search
CPC .......................... H04B 7/15521; H04L 1/0041
See application file for complete search history.

(56) References Cited

U.S. PATENT DOCUMENTS

| | | | | |
|---|---|---|---|---|
| 5,046,006 A | * | 9/1991 | Revord | B64G 3/00 89/1.1 |
| 5,495,580 A | * | 2/1996 | Osman | H04L 12/433 709/246 |

(Continued)

FOREIGN PATENT DOCUMENTS

| | | |
|---|---|---|
| WO | 2012022905 A1 | 2/2012 |
| WO | 2013093359 A1 | 6/2013 |

OTHER PUBLICATIONS

International Search Report dated Mar. 18, 2016 for corresponding International Application No. PCT/FR2014/053432, filed Dec. 18, 2014.

(Continued)

*Primary Examiner* — Joseph D Torres
(74) *Attorney, Agent, or Firm* — David D. Brush; Westman, Champlin & Koehler, P.A.

(57) ABSTRACT

A relaying method performed by a half duplex relay for a telecommunications system. The method includes a reception stage of receiving codewords transmitted by a source, the successive codewords corresponding to B blocks, the first of which can be decoded independently of the other blocks. This stage includes a decoding step of estimating a message from each source based on received codewords, the message being associated with the codewords transmitted by the source. The relay performs an error detection and decision-taking step on messages that are decoded without error. The relay encodes a signal and forwards it to the destination, wherein the signal is representative of only those messages that are decoded without error, such that the relay passes from non-selective reception to selective recep- (Continued)

tion after receiving B1 blocks and switches from the reception stage to the encoding and forwarding stage under control of the error detection and decision stage.

14 Claims, 7 Drawing Sheets

(51) Int. Cl.
    *H04L 5/16*     (2006.01)
    *H04L 29/08*     (2006.01)

(52) U.S. Cl.
    CPC .......... *H04L 1/0041* (2013.01); *H04L 1/0045* (2013.01); *H04L 1/0057* (2013.01); *H04L 1/0061* (2013.01); *H04L 1/0077* (2013.01); *H04L 5/16* (2013.01); *H04L 69/324* (2013.01); *H04L 2001/0097* (2013.01)

(56) References Cited

U.S. PATENT DOCUMENTS

| | | | |
|---|---|---|---|
| 6,263,466 B1* | 7/2001 | Hinedi | H03M 13/2903 370/389 |
| 6,654,562 B1* | 11/2003 | Murata | H04J 14/02 341/100 |
| 8,204,086 B2 | 6/2012 | Luo et al. | |
| 2007/0220403 A1* | 9/2007 | Allen | H04L 1/0009 714/774 |
| 2009/0232043 A1* | 9/2009 | Wu | H04B 7/15521 370/312 |
| 2009/0252146 A1 | 10/2009 | Luo et al. | |
| 2011/0307756 A1 | 12/2011 | Nguyen et al. | |
| 2012/0155373 A1 | 6/2012 | Yokomakura et al. | |
| 2013/0034044 A1 | 2/2013 | Hatefi et al. | |
| 2013/0250776 A1 | 9/2013 | Hatefi et al. | |
| 2014/0093017 A1 | 4/2014 | Osseiran | |
| 2015/0067454 A1 | 3/2015 | Benammar et al. | |

OTHER PUBLICATIONS

Written Opinion dated Mar. 18, 2016 for corresponding International Application No. PCT/FR2014/053432, filed Dec. 18, 2014.
International Search Report dated Mar. 18, 2016 for corresponding International Application No. PCT/FR2014/0053433, filed Dec. 18, 2014.
Written Opinion dated Mar. 18, 2016 for corresponding International Application No. PCT/FR2014/053433, filed Dec. 18, 2014.
Atoosa Hatefi et al.: "Full Diversity Distributed Coding for the Multiple Access Half-Duplex Relay Channel". IEEE 2011.
Marwan H. Azmi et al.: "Design of distributed multi-edge type LDPC codes for multiple access relay channels". IEEE 2011.
C. Hausl, F. Schrenckenbach, I. Oikonomidis, G. Bauch, "Iterative network and channel coding on a Tanner graph," Proc. Annual Allerton Conference on Communication, Control and Computing, Monticello, IL, 2005.
C. Hausl, P. Dupraz, "Joint Network-Channel Coding for the Multiple-Access Relay Channel," Proc. IEEE SECON'06, Reston, VA, Sep. 2006.
S. Yang, R. Koetter, "Network coding over a noisy relay: A belief propagation approach", Proc. IEEE ISIT'07, Nice, France, Jun. 29, 2007.
L. Bahl, J. Cocke, F. Jelinek, and J. Raviv, "Optimal Decoding of Linear Codes for minimizing symbol error rate", IEEE Transactions on Information Theory, vol. IT-20(2), pp. 284-287, Mar. 1974.
English translation of the International Written Opinion dated Mar. 18, 2016 for corresponding International Application No. PCT/FR2014/053432, filed Dec. 18, 2014.
English translation of the International Written Opinion dated Mar. 18, 2016 for corresponding International Application No. PCT/FR2014/053433, filed Dec. 18, 2014.
Office Action dated Feb. 22, 2018 from the United States Patent and Trademark Office, for corresponding U.S. Appl. No. 15/106,721.

* cited by examiner

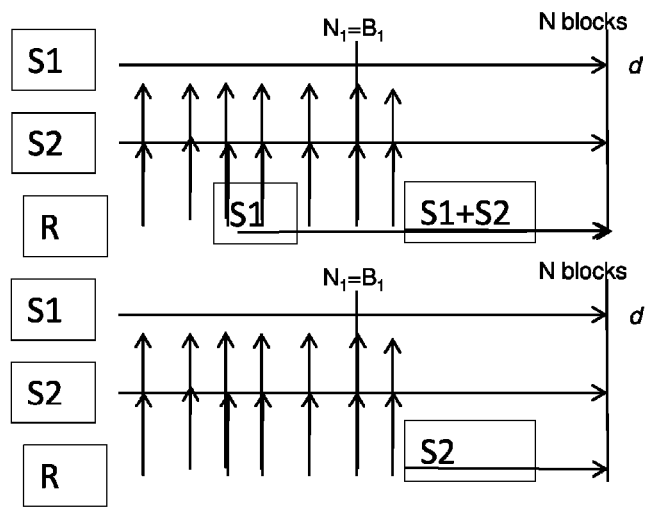
fig.6
fig.7
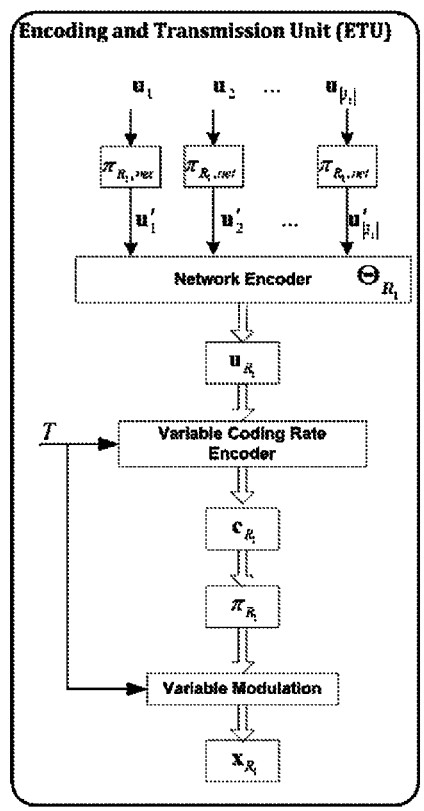
fig.8
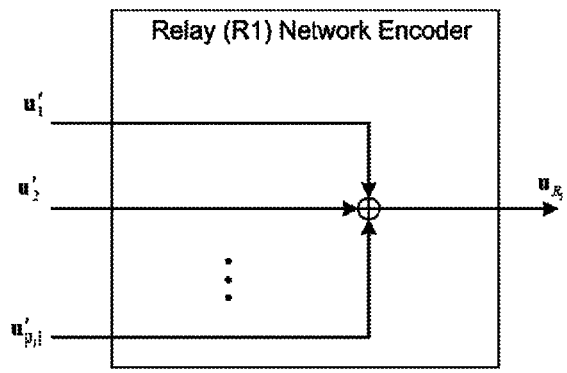
fig.9

METHOD FOR TRANSMITTING A DIGITAL SIGNAL FOR A MARC SYSTEM HAVING A DYNAMIC HALF-DUPLEX RELAY, CORRESPONDING PROGRAM PRODUCT AND RELAY DEVICE

CROSS-REFERENCE TO RELATED APPLICATIONS

This Application is a Section 371 National Stage Application of International Application No. PCT/FR2014/053432, filed Dec. 18, 2014, the content of which is incorporated herein by reference in its entirety, and published as WO 2015/092302 on Jun. 25, 2015, not in English.

FIELD OF THE DISCLOSURE

The field of the invention is that of transmitting encoded data in a multiple access relay channel (MARC) network. A MARC network is a telecommunications system with at least four nodes having at least two sources (transmitters), a relay, and a destination (receiver). More precisely, the invention relates to network coding and it seeks to improve the quality of data transmission, and in particular to improve the performance of error-correcting decoding in a receiver.

The invention relates particularly, but not exclusively, to transmitting data via mobile networks, e.g. for real-time applications.

BACKGROUND OF THE DISCLOSURE

Networks, and in particular mobile networks, are looking for significant improvements in terms of capacity, reliability, consumption, etc. The transmission channel of a mobile network has the reputation of being difficult, and leads to transmission of reliability that is relatively poor. Over the last few years, considerable progress has been achieved in terms of encoding and modulation, in particular concerning consumption and capacity. Specifically, in a mobile network where a plurality of transmitters/receivers share the same resources (time, frequency, and space) it is necessary to reduce transmission power as much as possible.

Such reduction goes against the coverage and thus against the capacity of the system, and more generally against its performance.

In order to increase coverage, make communication more reliable, and more generally improve performance, one approach consists in relying on relays for increasing spectrum efficiency and thus improving the transmission efficiency and the reliability of systems. The topology of MARC systems, as shown in FIG. 1, is such that the resources, nodes $S_1$ and $S_2$, broadcast their encoded information sequences for the attention of the relay R and of the destination D. The relay decodes the signals received from the sources $S_1$ and $S_2$ and it re-encodes them jointly while adding its own redundancy so as to create a spatially-distributed network code. At the destination D, the decoding of the three spatially-distributed encoded sequences, comprising the two encoded sequences received directly from the sources $S_1$ and $S_2$ and the encoded sequence coming from the relay, relies on joint channel/network decoding algorithms.

Network coding is a form of cooperation in which the nodes of the network share not only their own resources (power, bandwidth, etc.) but also their computation capacity, in order to create a distributed code that becomes more and more powerful as the information propagates through the nodes. It gives rise to substantial improvement in terms of diversity and of encoding, and thus in terms of transmission reliability.

For a MARC system, it is considered that the data rate in bits per second (bits/s) of the sources and of the relay is 1/Ts and that the total available transmission duration is set at T. Thus, the number of available channel uses that can be shared between the sources and the relay is N=DT. If consideration is given to using the Nyquist data rate and transmitting a pulse of sinc (cardinal sine) waveform, then N is the total number of available complex dimensions and D is the total available bandwidth of the system.

A distinction is made between two types of operation for the relay: half-duplex mode and full-duplex mode.

In the known half-duplex mode, a distinction is drawn between two stages of transmission that correspond to different transmission channel uses, since the relay is not capable of receiving and transmitting simultaneously. The sources and the relay thus split the total number of transmission channel uses in two, corresponding to the two stages. During the first stage, which comprises the first transmission channel uses (time slots), both sources transmit, but not the relay. The relay performs joint decoding/re-encoding in order to deduce the signal for transmission during subsequent transmission channel uses. During the second stage, which comprises the second transmission channel uses, the relay transmits the signal as determined during the first transmission channel uses, and the sources transmit the second parity sequences relating to the same information as was transmitted during the first transmission channel uses. The relay thus complies with certain timing that is set by the duration of the second stage. Half-duplex type relays are attractive because they present a simple communications scheme and because they are easy to implement and thus of low cost.

PCT patent application WO2012/022905 A1 in the name of the same applicant describes a half-duplex relay that operates using the above two-stage timing for a MARC system having non-orthogonal links. The relay performs a relaying method in which words that are decoded erroneously are not transmitted, in application of a technique known as selective decode and forward (SDF). In that technique, the relay attempts to decode the messages from the sources and transmits the result of a deterministic function of only those messages that are detected without error. The error detection is performed using a cyclic redundancy check (CRC) that is included in the source messages.

Although the selective relaying technique presents undeniable advantages by avoiding error propagation by the relay, its use with a half-duplex relay has the drawback of requiring that the relay and the sources determine and know the respective durations of the two transmission stages.

SUMMARY

The invention provides a method of relaying a digital signal for a network having at least four nodes comprising two sources (transmitters), a relay, and a destination (receiver) that are connected together by links. The relaying method is performed by a half-duplex relay for a telecommunications system comprising a plurality of sources, the half-duplex relay, and a destination. The method comprises:
  a reception stage of receiving codewords transmitted by the sources during N uses of the channel, the successive codewords transmitted by a source corresponding to B blocks, the first of which can be decoded independently of the other blocks, this stage including a decoding step of estimating a message from each source on the basis of received codewords, the message being associated with the codewords transmitted by the source;

an error detection and decision-taking step performed by the relay on messages that are decoded without error; and a stage of encoding a signal and forwarding it to the destination, which signal is representative of only those messages that have been decoded without error;

such that the relay passes from non-selective reception to selective reception after receiving B1 blocks and switches from the reception stage to the encoding and forwarding stage under the control of the error detection and decision-taking step, where 1≤B1<B−1, B>2.

The invention also provides a half-duplex relay for a telecommunications system comprising a plurality of sources, the relay, and a destination, for performing a relaying method. The half-duplex relay comprises:

decoder means for estimating a message from each source on the basis of received words corresponding to codewords transmitted by the sources during N channel uses, the successive codewords transmitted by a source corresponding to B blocks, the first of which can be decoded independently of the other blocks, which message is associated with the codewords transmitted by the source;

encoding and forwarding means; and decision means for deciding which messages have been decoded without error in order to cause the relay to pass from non-selective reception to selective reception after receiving B1 blocks, and switch means for switching messages that have been decoded without error to the encoding and forwarding means, where 1≤B1<B−1, B>2.

The half-duplex relay of the invention operates in dynamic and non-constant manner, being capable of adapting its operation as a function of errors in decoding messages received from a plurality of sources.

Below a threshold B1 for the number of uses of the transmission channel that have taken place, the relay remains in a non-selective listening mode. In this mode, the relay attempts to detect and decode without error the messages from all of the sources. As soon as a number of channel uses that have taken place exceeds the threshold B1, the relay passes into a selective listening mode. In this mode, the relay switches from a listening stage in which it attempts to detect and decode without error the messages from the sources to a stage of encoding and forwarding a message to the destination as soon as the message is decoded without error. Thus, the relay passes from non-selective listening to selective listening if the elapsed time exceeds the threshold B1, which constitutes a parameter of the system. The threshold B1 thus makes it possible to avoid penalizing sources that require more time for decoding than a source having a source-relay link that is considerably better than the source-relay links of the other sources. Setting the threshold B1 thus makes it possible to introduce operating flexibility into the MARC system that enables the relay to adapt to differing environments between the sources. B1 may be variable, e.g. for each B block codeword or as a function of some number of codewords. The listening time of the relay is not constant, unlike prior techniques that make use of a half-duplex relay in a MARC system. This flexibility makes it possible firstly to adapt to instantaneous variation in the quality of the source-relay links, which is not possible with prior art techniques. Furthermore, in the event of a link between one of the sources and the relay being very poor, lengthening the non-selective listening time can make it possible in the end for the relay to decode the source and forward a signal representative of the messages from all of the sources to the destination. Also, even if this source cannot be decoded without error, the relay can nevertheless assist the destination by forwarding a signal representative of the messages from the other sources that have been decoded without error after passing into the selective listening mode. Furthermore, this operation is completely transparent for the sources; only the relay adapts its listening mode.

Thus, the invention relies in particular on the distinction between two listening modes of the relay, a total listening mode and a selective listening mode. During the total listening mode, the relay waits to decode the messages from all of the sources without error on the basis, for any one source, of all or some of the received codewords transmitted by that source, before encoding and forwarding the messages that have been decoded without error. After passing from the total listening mode to the selective listening mode, the relay acts, after encoding, to forward the first message decoded without error. The switchover from a listening stage to an encoding and forwarding stage thus takes place dynamically and no longer at a fixed moment, as in the prior art selective relaying method. This flexibility of switchover enables the operation of the relay to be adapted to the quality of the channels between the sources and the relay, which is not possible if the listening time of the relay is constant relative to the duration of transmission from the sources. Unlike the prior art selective relaying method, the invention distinguishes between two listening modes that increase the probability of being able to decode a plurality of sources without error even when one of the source-relay links is of quality that is much better than the other links.

In an embodiment, the sources transmit simultaneously over the same radio resource, and the decoding step is iterative and comprises joint detection and joint decoding.

The transmission by the sources takes place simultaneously over the same radio resource (time and frequency), which makes it possible to maximize use of the common spectrum resource; the source-relay links are not orthogonal. There is thus interference between the signals received by the relay and by the destination as a result of the source signals being superposed during transmission firstly between the sources and the relay and secondly between the sources and the destination. When the sources transmit simultaneously but on different spectrum resources, the relay does not need the iterative joint detection and decoding step. Under such circumstances, the relay can decode the messages from the sources on the basis of sequences received without interference between the sources.

In an implementation, among the B blocks transmitted successively by a source, the accumulation of blocks from 1 to b is a codeword of a code of coding rate that decreases with b, 1≤b≤B.

In an implementation, the encoding and forwarding stage comprises network encoding which is a non-bijective surjective function applied to the messages that are decoded without error In an implementation, the non-bijective surjective function is an exclusive-or of the messages decoded without error.

In an implementation, the incremental redundancy code is a punctured turbo code of variable coding rate.

In an implementation, the incremental redundancy code is a punctured convolutional code of variable coding rate.

In an implementation, the incremental redundancy code is an LDPC code of variable coding rate.

In an implementation, when the decision concerning messages decoded without error occurs after the $T^{th}$ use of the transmission channel then the relay determines a modulation order $q_r$, and a channel encoding length $n_r$ used by the encoding and forwarding step that satisfy the following equation:

$$n_r = q_r \left( N - \sum_{i=1}^{T} N_i \right)$$

with $N_i$ being the first T channel uses from among the N successive transmission channel uses.

In an implementation, the step of deciding on messages that have been decoded without error is performed by means of a CRC type code.

In an implementation, the encoding and forwarding stage comprises channel encoding such that the channel encoded codeword is interleaved per block, each block of the codeword being interleaved by an interleaver that is distinct among the blocks, and the encoding and forwarding stage further comprises selecting blocks from among the codeword blocks after interleaving in order to adapt the length of the codeword for forwarding to the number of channel uses that remain after the relay has switched from the reception stage to the encoding and forwarding stage.

In an embodiment, the encoding and forwarding means comprise modulator means and channel encoding means, and wherein when the decision means decide to change over after the $T^{th}$ use of the channel, then the relay determines a modulation order $q_r$ for the modulation means and a channel encoding length $n_r$ for the channel encoding means that satisfy the following equation:

$$n_r = q_r \left( N - \sum_{i=1}^{T} N_i \right)$$

with $N_i$ being the first T channel uses from among the N successive channel uses.

The various above implementations and embodiments may be optionally combined with one or more of these implementations and embodiments in order to define others.

The invention also provides a MARC system, possibly a MIMO system, that is adapted to perform a method of the invention.

Thus, a MARC system of the invention includes a relay of the invention.

In a preferred embodiment, the steps of the relaying method are determined by instructions of a relaying program incorporated in one or more electronic circuits such as chips, which themselves may be arranged in electronic devices of the MARC system. The relaying method of the invention may equally well be performed when the program is loaded into a calculation member such as a processor or the equivalent with its operation then being controlled by executing the program.

Consequently, the invention also applies to a computer program, in particular a computer program on or in a data medium, and suitable for performing the invention. The program may use any programming language, and it may be in the form of source code, object code, or code intermediate between source code and object code, such as in a partially compiled form, or in any other desirable form for implementing a method of the invention.

The data medium may be any entity or device capable of storing the program. For example, the medium may comprise storage means such as a read only memory (ROM), for example a compact disk (CD) ROM or a microelectronic circuit ROM, or indeed magnetic recording means, e.g. a hard disk or a universal serial bus (USB) stick.

Alternatively, the data medium may be an integrated circuit in which the program is incorporated, the circuit being adapted to execute or to be used in the execution of the method in question.

Furthermore, the program may be converted into a transmissible form such as an electrical or optical signal that can be conveyed via an electrical or optical cable, by radio, or by other means. The program of the invention may in particular be downloaded from a network of the Internet type.

BRIEF DESCRIPTION OF THE DRAWINGS

Other characteristics and advantages of the invention appear more clearly on reading the following description of preferred implementations given merely as illustrative and nonlimiting examples, and from the accompanying drawings, in which:

FIG. 6 shows an implementation of the sequencing at the relay when the relay decodes one of the sources during the non-selective listening mode and when the relay decodes the other source successfully only after passing into the selective listening mode, in a two-source context;

FIG. 7 shows an implementation of the sequencing at the relay when the relay decodes one of the sources successfully only after passing into the selective listening mode, in a two-source context;

FIG. 8 is a diagram of the encoding and transmission unit ETU of a relay of the invention;

FIG. 9 is a diagram of a network coding function of the encoding and transmission unit ETU of a relay of the invention for a MARC system with one relay;

DETAILED DESCRIPTION OF ILLUSTRATIVE EMBODIMENTS

There is no constraint on the transmission channel; it may be subject to fast or slow fading, it may be frequency selective, and it may be a multiple-input and multiple-output (MIMO) channel. In the description below, it is assumed that the nodes of the MARC system are accurately synchronized and that the sources are independent (there is no correlation between them).

The invention lies in the context of a MARC system having M sources $S_1, S_2, \ldots, S_M$, one or more relays R, and a destination D. The sources and the relays are assumed to be provided with respective single transmit antennas in order to simplify the description. It should naturally be understood that the sources and the relays could be provided with respective pluralities of transmit antennas. The relays and the destination are assumed to be provided with respective single receive antennas in order to simplify the description, but it should naturally be understood that they may be provided with respective pluralities of antennas.

Figure 1:
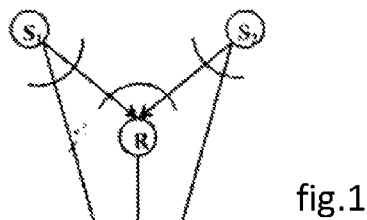
FIG. 1 is a diagram showing the basic topology of MARC systems having two sources, one relay, and one destination, as described when describing the prior art.

The basic topology of a MARC system is shown in FIG. 1, this system having two sources and one relay. By way of example, the sources are users who seek to transmit messages to a common destination, e.g. a base station of a mobile access network. The sources are assisted by a relay, which may be a cut-down base station, or for example one of the sources, when that source lies on the path between the sources and the base station.

In a particular use, the two sources correspond to two mobile terminals. In another use, the two sources may correspond to two different services that are accessible from a single terminal, but under such circumstances the terminal is provided with at least two antennas that determine two different propagation channels between the terminal and the relay, and between the terminal and the destination.

Each transmission cycle is made up of N channel uses or transmission slots. The duration of a cycle depends on the settings of the MARC system and in particular on the MAC layer of the seven-layer OSI model.

One cycle corresponds to the time during which a source transmits a message of k information bits. In the presently described example, the sources transmit their own messages of k information bits simultaneously during the N channel uses. CRC type information is included in each k bit message transmitted by a source, and it is used to determine whether a received message is decoded correctly.

The invention proposes a novel approach to using the relay(s) of a MARC system in order to improve the spectrum efficiency of transmission.

Figure 2:
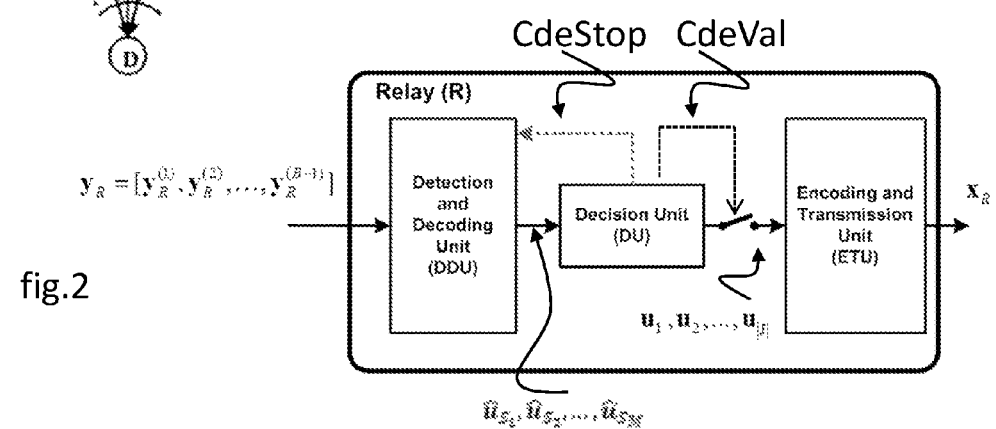
FIG. 2 is a diagram of a relay of the invention.
Figure 3:
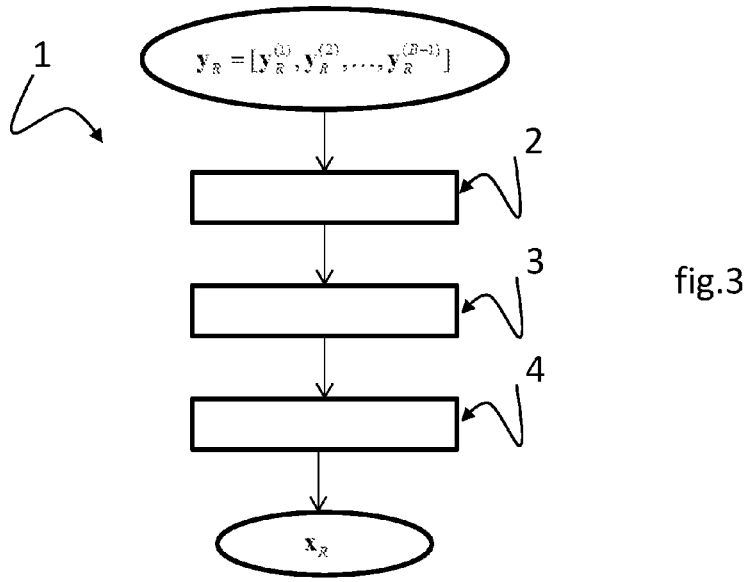
FIG. 3 is a simplified flowchart showing the sequencing of operations at the relay of the invention.

A relaying method of the invention is performed by the at least one half-duplex relay of the MARC system. This relay R of the invention is shown in FIG. 2. The relay comprises an iterative joint detection and decoding unit DDU followed by a decision unit DU and by an encoding and transmission unit ETU. A flowchart of the method performed by the relay R is shown in FIG. 3. The method 1 comprises a received stage 2, an error detection and decision step 3, and an encoding and forwarding stage 4.

$\mathbb{F}_2$ is the two element Galois field, $\mathbb{R}$ is the real number field and $\mathbb{C}$ is the complex number field.

Figure 4:
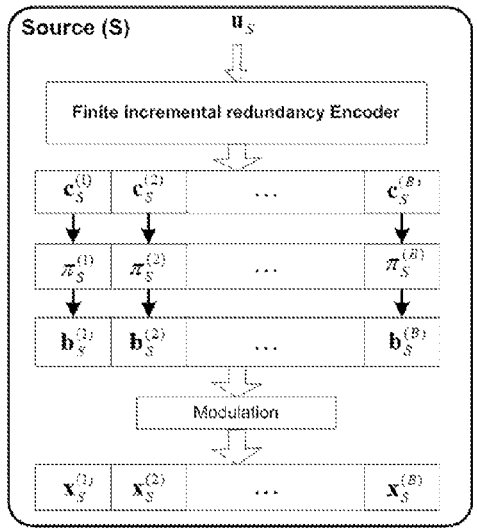
FIG. 4 is a diagram of a source of the invention.

Each source S, as shown in FIG. 4, from among the M sources $\{S_1, S_2, \ldots, S_M\}$ of the MARC system has a message $u_S$ comprising k information bits to be transmitted, $u_S \in \mathbb{F}_2^k$. The message $u_S$ includes a CRC type code that makes it possible to verify the integrity of the message $u_S$.

The statistically independent sources $\{S_1, S_2, \ldots, S_M\}$ perform encoding of the message $u_S$ by means of an incremental redundancy code and they transform the message $u_S$ into $n_S$ bits written $c_S \in \mathbb{F}_2^{n_S}$. The resulting codeword $c_S$ is segmented into B redundancy blocks written $c_S^{(i)} \in \mathbb{F}_2^{n_{S,i}}$ with $i=1, 2, \ldots, B$. Each block comprises $n_{S,i}$ bits, with $$n_S = \sum_{i=1}^{B} n_{S,i}.$$

The incremental redundancy code may be of the systematic type, in which case the information bits are included in the first block: $u_S \in c_S^{(1)}$. Regardless of whether or not the incremental redundancy code is of the systematic type, it is such that the first block $c_S^{(1)}$ from among the B blocks can be decoded independently of the other blocks. The highest coding rate is $k/n_{S,1}$ and it cannot be greater than one, $n_{S,1} \geq k$. The minimum coding rate for a source S is $k/n_S$. Each block $\{c_S^{(i)}: 1 < i \leq B\}$ after the first block includes parity bits that add redundancy to the first block, each of the blocks $\{c_S^{(i)}: 1 < i \leq B\}$ being capable of being decoded jointly with the blocks 1 to i−1. By way of example, the incremental redundancy code belongs to the following non-exhaustive list: raptor code (RC), rate compatible punctured turbo code (RCPTC), rate compatible punctured convolutional code (RCPCC), rate compatible low density check code (LDPC).

Each codeword or block $c_S^{(i)}$ is interleaved by a distinct interleaver written $\pi_S^{(i)}$, the codeword after interleaving being written $b_S = [b_S^{(1)}, b_S^{(2)}, \ldots, b_S^{(B)}]$. The interleavers serve to combat fading, which may occur during transmission via the channel, and to give each source a fingerprint that makes the sources easier to separate by the relay and by the destination. Each interleaved portion $b_S^{(i)}$ of the codeword is modulated in order to obtain a complex codeword $x_S = [x_S^{(1)}, x_S^{(2)}, \ldots, x_S^{(B)}]$ with $x_S^{(i)} \in \chi^{N_i}$, $i=1, 2, \ldots, B$ where $\chi \subset \mathbb{C}$ designates a complex signal of cardinal number $|\chi| = 2^{q_S}$ and where $N_i = n_{S,i}/q_S$.

Each source S among the M sources $\{S_1, S_2, \ldots, S_M\}$ may use a minimum coding rate $k/n_S$ and a modulation order $q_s$ that are different from those of the other sources, in so far as the number of uses of the channel by each portion of the transmitted complex codeword is identical between the sources: $n_{S,i}/q_S = N_i$, $i=1, 2, \ldots, B$.

Each source S transmits the codeword $x_S = [x_S^{(1)}, x_S^{(2)}, \ldots, x_S^{(B)}]$ made up of B blocks during N uses of the transmission channel. Whatever the value of i, $1 \leq i \leq B$, the concatenation (or accumulation) of the blocks 1 to i is itself a codeword since it comes from the incremental redundancy encoder.

Reception stage 2 is performed by the iterative joint detection and decoding unit DDU of the relay. This step comprises a step of iterative joint detection and decoding of the codeword $x_S = [x_S^{(1)}, x_S^{(2)}, \ldots, x_S^{(B)}]$ transmitted by each source S from among the M sources $\{S_1, S_2, \ldots, S_M\}$. This iterative joint detection and decoding step provides an estimate of the received words.

The reception stage is under the control of the detection and decision step. For example, control is performed by means of a stop command CdeStop. When the stop command CdeStop is valid, the relay stops the joint detection and decoding iterations.

Figure 5:
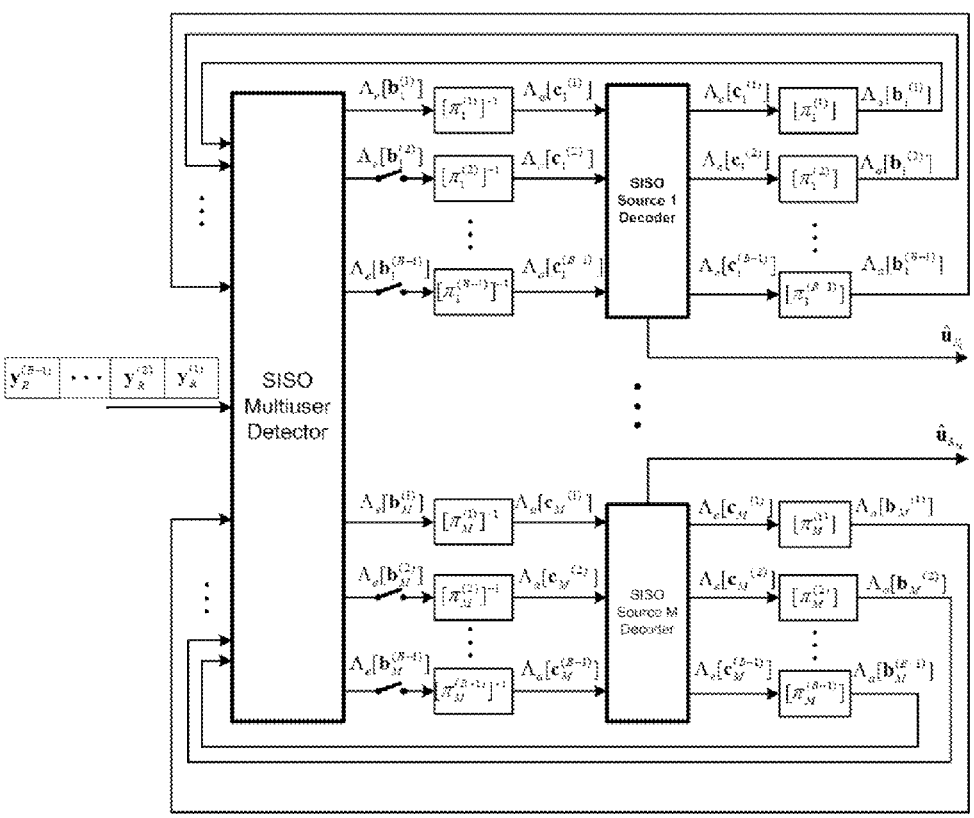
FIG. 5 is a diagram of the DDU unit for iterative joint detection and decoding in a relay of the invention.

The joint detection and decoding unit DDU is shown in FIG. 5, it has an iterative structure constituted by a soft single input single output (SISO) multiuser detector (MUD) followed by as many soft channel decoders in parallel as there are sources $\{S_1, S_2, \ldots, S_M\}$. For the received block b, $b \in \{1, 2, \ldots, B\}$, the received sequence is expressed in the following form:

$$y_R^{(b)} = \sum_{i=1}^{M} h_{S_i,R} x_{S_i}^{(b)} + n_R^{(b)}$$

where $h_{S_i,R} \in \mathbb{C}$ represents the channel gain between the source $S_i$ and the relay R and where $n_R^{(b)} \in \mathbb{C}^{N_b}$ represents additive Gaussian noise. The DDU uses the current block b $y_R^{(b)}$ and all of the previously received blocks $y_R^{(1)}$, $y_R^{(2)}$, ..., $y_R^{(b-1)}$ in order to obtain an estimate of the messages $\hat{u}_{S_1}, \hat{u}_{S_2}, \ldots, \hat{u}_{S_M}$ from the sources.

At the end of receiving the first block, the multiuser detector MUD calculates, in the form of a log likelihood ratio (LLR), the a posteriori probabilities (APP) of the information bits of each interleaved and coded bit from each source S:

$$LAPPR: \Lambda[b_S^{(1)}]_k = \log\left(\frac{Pr([b_S^{(1)}]_k = 1 \mid y_R^{(1)})}{Pr([b_S^{(1)}]_k = 0 \mid y_R^{(1)})}\right)$$

$$k = 1, 2, \ldots, n_{S,1}$$

in which expression $n_{S,1}$ is the number of bits transmitted by each source S in the first block. This LAPPR may be written in the following form:

$$\Lambda[b_S^{(1)}]_k = \Lambda_a[b_S^{(1)}]_k + \Lambda_e[b_S^{(1)}]_k$$

in which expression $\Lambda_a[b_S^{(1)}]_k$ is the logarithm of the a priori probability ratio (LAPR) supplied by the channel decoder of each source at the preceding iteration, and $\Lambda_e[b_S^{(1)}]_k$ is the extrinsic information associated with the bit $[b_S^{(1)}]_k$.

The vector $\Lambda_e[b_S^{(1)}]_k$ is deinterleaved by a deinterleaver $[\pi_S^{(1)}]^{-1}$, and the output $\Lambda_a[b_S^{(1)}]_k$ is the logarithm of the a priori probability ratio of the first block. The channel decoder of the source S uses $\Lambda_a[b_S^{(1)}]_k$ to provide a decoded version $\hat{u}_{S_i}$ of the message $\hat{u}_{S_i}$ and to provide extrinsic information $\Lambda_e[c_S^{(1)}]$ about the bits. This extrinsic information is interleaved by the interleaver $\pi_S^{(1)}$. The output $\Lambda_a[b_S^{(1)}]$ from the interleaver is looped back to the input of the SISO multiuser detector (MUD) and marks the end of one iteration.

The iterations of the DDU stop either because they have reached a maximum number of iterations, or else under the control of the error detection and decision step, e.g. because the error detection and decision step issues a stop command CdeStop.

At the end of receiving the block b, the switches corresponding to this block b and to all of the preceding blocks are switched. The procedure described for the first block is repeated, but taking into consideration $[b_S^{(1)}, \ldots, b_S^{(b)}]$ instead of $[b_S^{(1)}]$. At the end of receiving the block b=B−1, all of the switches of the DDU are switched and the procedure described for the first block is repeated, but taking into consideration $[b_S^{(1)}, \ldots, b_S^{(B-1)}]$ instead of $[b_S^{(1)}]$.

The DDU does not use the last block b=B, since even though it would enable the relay to decode the messages correctly, the relay would no longer have the use of the channel for transmitting a representative signal to the destination.

Error detection and decision step 3 is performed by the decision unit DU. Step 3 detects the errors in the decoded messages $\hat{u}_{S_1}, \hat{u}_{S_2}, \ldots, \hat{u}_{S_M}$ after each joint detection and decoding iteration. In an implementation, this error detection is performed by making use of CRC type information included in the first of the B blocks coming from the sources.

Beyond a threshold B1 of received blocks, the relay passes from a non-selective listening mode to a selective listening mode. Thus, after receiving B1 blocks, the relay passes from a mode of detecting and decoding all of the sources without error to a mode of selectively detecting and decoding at least one source without error, $1 \leq B1 < B-1$, where B1 is a parameter of value that may be constant or that may vary dynamically. For example, the value of B1 may be based on a priority criterion for the messages from the sources in order to ensure a QoS based on the instantaneous quality of the transmission channel between the sources and the relay, based on the level of charge in the battery of the relay if it is a mobile terminal, etc.

In the selective listening mode, as soon as the DU detects a message that has been decoded without error in the decoder from among the messages $\hat{u}_{S_1}, \hat{u}_{S_2}, \ldots, \hat{u}_{S_M}$, it moves the relay on from the reception stage to the encoding and forwarding stage, e.g. by issuing the command CdeStop in order to stop the joint detection and decoding iterations of the DDU and by issuing the command CdeVal. The messages that are detected without error from among the messages $\hat{u}_{S_1}, \hat{u}_{S_2}, \ldots, \hat{u}_{S_M}$ are forwarded to the ETU.

FIG. 6 shows the situation of a MARC system having two sources S1 and S2 in which the relay decodes the message from the source without error before the threshold B1, and decodes the message from the source S2 after switching to selective listening. As soon as it detects the message from the source S2 without error, it switches to the stage of encoding and forwarding the messages from S1 and from S2, and it can stop the joint detection and decoding iterations in order to avoid performing pointless computations.

FIG. 7 shows the situation of a MARC system having two sources S1 and S2 in which the relay does not manage to decode the messages from the two sources without error before the threshold B1. After this threshold, the relay passes into a selective listening mode and as soon as it detects the message from the source S2 without error, it switches to the stage of encoding and transmitting the message from S2, and it can stop the joint detection and decoding iterations in order to avoid performing pointless computations.

Stage 4 of encoding and forwarding to the destination is performed by the ETU shown in FIG. 8. This encoding and forwarding stage encodes the messages that have been decoded without error in order to transmit a signal that is representative only of these messages that have been decoded without error. The relay encodes jointly only those messages that have been decoded without error and it adds its own redundancy so as to create a network code.

This encoding and forwarding stage is under the control of the error detection and decision step, i.e. it takes place only after the relay has switched from the reception/listening stage to the stage of encoding followed by transmission, e.g. once the authorization command CdeVal has been issued. The authorization and stop commands CdeVal and CdeStop are issued simultaneously.

The relay switches from the reception/listening stage to the encoding stage at the end of receiving the $T^{th}$ block, $1 \leq T \leq B-1$, or in the absence of any message that has been decoded without error, it does not switch.

Before switching into the encoding and forwarding stage, the relay thus has k information bits available from each source for which the message has been decoded correctly.

After switching, the relay thus has k information bits available from each source for which the message has been decoded correctly.

With reference to the relay $R_1$, the messages $u_i$ that have been decoded without error are initially interleaved with interleavers $\pi_{R_{1,net}}$. The interleaved messages $u'_i$ are then encoded. The ETU performs encoding that comprises a linear combination in a finite Galois field GF(q) of the messages that have been decoded without error and that have been interleaved, this combination $\Theta_{R_1}$ providing joint encoding of only those messages that have been detected without error thus adding its own added redundancy, thereby creating a network code.

With reference to the relay Rj, the associated network coding is the vector $$a_j = [a_{1,j}\, a_{2,j}\, \ldots\, a_{M,j}]^T$$

of dimension M. Assume that for a given configuration, this relay detects only J messages without error of indices lying in the set $J_j \subset \{1, \ldots M\}$, then the result of the network coding $u_{R,j}$ is the linear combination $$u_{R,j} = \sum_{i \in J_j} a_{i,j} u'_i,$$

where $u'_i$ represents the message from the source i that has been decoded without error and then interleaved with $i \in J_j$. This amounts to setting to 0 the coefficients $\{a_{i,j}\}_{i \notin J_j}$ of the vector $a_j$ having indices that are not included in the set $J_j$.

As a result, it is possible to define effective network coding for each relay that depends on messages from sources that it has not been possible to detect without error (interruption of the link from the source to the corresponding relay). In this context, nontransmission from a relay is effective network coding that consists in a zero vector of dimension M. The vector $u_{R,j}$ may be obtained from the matrix T such that:

$$[\hat{u}'_{S_1}, \ldots, \hat{u}'_{S_M}]T = [u_{R_1}, \ldots, u_{R_L}]$$

where $\hat{u}'_{S_1}, \ldots, \hat{u}'_{S_M}$ are the messages as decoded and then interleaved, T is the encoding matrix of dimension M×L associated with the configuration of the interruptions taken into consideration of the source to relay links, and L is the number of relays in the MARC system. When the number Q of source to relay links that are interrupted is less than or equal to L, the network coding is said to have full diversity if and only if the matrix $$G = [I_M\, T]$$

remains of full rank M when L−Q columns are deleted at random. This property is true for any configuration of interruptions if for Q=0 (no source to relay links interrupted) the matrix:

$$G_0 = [I_M\, T_0]$$

represents a maximum distance separable (MDS) code of minimum distance L+1 (Hamming minimum distance). Since Q=0, it follows that $$T_0 = [a_1\, a_2\, \ldots\, a_L]$$

In general manner, the function $\Theta_R$ is a surjective (onto) function but it is not a bijective (1-to-1) function over the messages detected without error, and this function is referred to as the network coding function for $|J_j| > 1$ where $|J_j|$ is the cardinal number of the set $J_j$.

Specifically, there must be at least two messages decoded without error in order to be able to apply network coding.

In one embodiment, the MARC system has one relay and two sources.

The associated network code $\Theta_{R_1}$, shown in FIG. 8 and shown in greater detail in FIG. 9, is the vector $a_1 = [1, \ldots 1]^T$ of dimension M in the two element Galois field, i.e. F2. Assume that for a given configuration, this relay detects only J messages without error having indices in the set $J_1 \subset \{1, \ldots M\}$, then the result of the network coding $u_{R_1}$ in the selective reception mode is the linear combination $$u_{R_1} = \sum_{i \in J_1} u'_i;$$

the addition in F2 is XOR. This amounts to setting to zero the coefficients $\{a_{i1}\}_{i \notin J_1}$ of the vector $a_1$ having indices that are not included in the set $J_1$. As a result, it is possible to define effective network encoding that depends on messages from sources that it has not been possible to detect without error (interruption of the link from the source to the corresponding relay). In this context, nontransmission from a relay is effective network coding that consists in a zero vector of dimension M. The vectors $u_R$ may be obtained from the vector T such that:

$$[\hat{u}'_{S_1}, \ldots, \hat{u}'_{S_M}]T = [u_{R_1}, \ldots, u_{R_L}]$$

where T is the encoding vector of dimension M associated with the configuration of the link to relay interruptions taken into consideration. When the number Q of source to relay links that are interrupted is less than or equal to 1, the network coding is said to have full diversity if and only if the matrix $$G = [I_M\, T]$$

(where $I_M$ is the identity matrix of dimension M) remains of full rank M when 1−Q columns are deleted at random. This property is true for any configuration of interruptions if for Q=0 (no source to relay links interrupted) the matrix:

$$G_0 = [I_M\ T_0] = \begin{bmatrix} 1 & 0 & \ldots & 0 & 1 \\ 0 & 1 & \vdots & 0 & 1 \\ \vdots & \vdots & \ddots & \vdots & \vdots \\ 0 & 0 & \ldots & 1 & 1 \end{bmatrix}$$

represents an MDS code with a minimum distance of two. It is clear that $T_0 = a_1$.

The network code in the non-selective reception mode amounts to nontransmission.

The code $u_{R_1}$ from the function $\Theta_{R_1}$ is encoded by a channel encoder. The $n_{R_1}$ bit codeword that is obtained is written $c_{R_1}$, $c_{R_1} \in \mathbb{F}_2^{n_{R_1}}$. This codeword may be represented in the form of a succession of blocks:

$$c_{R_1} = [c_{R_1}^{(T+1)}, c_{R_1}^{(T+2)}, \ldots, c_{R_1}^{(B)}]$$

with T being the $T^{th}$ transmission slot at the end of which the relay has k information bits per message that has been decoded without error. This codeword $c_{R_1}$ is interleaved by an interleaver $\pi_{R_1}$. This interleaved codeword may be represented in the form of a succession of blocks:

$$b_{R_1} = [b_{R_1}^{(T+1)}, b_{R_1}^{(T+2)}, \ldots, b_{R_1}^{(B)}]$$

When the relay has k information bits per message that has been decoded without error after the $T^{th}$ transmission slot, then the relay determines a modulation order $q_{R_1}$ and a channel code length $n_{R_1}$ satisfying equation:

$$n_{R_1} = q_{R_1}\left(N - \sum_{i=1}^{T} N_i\right)$$

with $N_i$ being the first T channel uses from among the N successive transmission channel uses. The modulation provides a complex codeword written $x_{R_1} \in \chi^{n_{R_1}/q_{R_1}}$ where $X \subset$ $\mathbb{C}$ designates a complex signal of cardinal number $|\chi|=2^{q_{R1}}$. This complex codeword may be represented in the form of a succession of blocks: $x_{R_1}=[x_{R_1}^{(T+1)}, x_{R_1}^{(T+2)}, \ldots, x_{R_1}^{(B)}]$.

In an implementation, the coding rate $k/n_{R_1}$ of the channel encoder is constant and thus the code length $n_{R_1}$ is constant. The modulation order is then variable and a function of the number of channel uses that remain for transmission from the relay, in the range T+1 to B.

In an implementation, the modulation order $q_{R_1}$ is constant. The coding rate of the channel encoder $k/n_{R_1}$ and thus the code length $n_{R_1}$ are then variable. This variation may be obtained by selecting one code from codes that are determined with fixed coding rates, it being possible for the code to be selected from the following non-exhaustive list: convolutional code, turbo code, LDPC code, etc. In an alternative, this variation may be obtained by finite incremental redundancy code.

In an implementation, the coding rate $k/n_{R_1}$ of the channel encoder and the modulation order $q_{R_1}$ are variable.

The destination receives the messages transmitted by the sources and possibly also the signal transmitted by the relay.

Thus, considering that the relay switches from the listening stage to the encoding and forwarding stage after the $T^{th}$ transmission slot, then the sequence received by the destination is written:

$$y_D^{(b)} = \sum_{i=1}^{M} h_{S_i,D} x_{S_i}^{(b)} + n_D^{(b)} \text{ with } b \in \{1, 2, \ldots, T\}$$

After the relay has switched, the sequence received by the destination is written:

$$y_D^{(b)} = \sum_{i=1}^{M} h_{S_i,D} x_{S_i}^{(b)} + h_{R,D} x_R^{(b)} + n_D^{(b)} \text{ with } b \in \{T+1, \ldots B\}$$

in which expressions $h_{S_i,D} \in \mathbb{C}$ represents the channel gain between the source Si and the destination D, $h_{R,D} \in \mathbb{C}$ represents the channel gain between the relay R and the destination D, and $n_R^{(b)} \in \mathbb{C}^{N_b}$ is a noise vector.

At the end of the N transmission channel uses, the destination attempts to extract the messages from each source. By writing the received blocks:
$c_S^{(I)}=[c_S^{(1)}, c_S^{(2)}, \ldots, c_S^{(T)}]$ up to the $T^{th}$ transmission slot; and
$c_S^{(II)}=[c_S^{(T+1)}, \ldots, c_S^{(B)}]$ after the $T^{th}$ transmission slot.
then the operation of the joint channel-network decoder of the destination is shown diagrammatically in FIG. 10.

At each decoding iteration:
Step 1, the multiuser detector:
calculates the logarithms of the a priori probability ratios (LAPR) of the codewords from the sources and transmits them to the channel decoders;
calculates the LAPR of the codeword from the relay and transmits it to the network decoder;
Step 2, the channel decoders:
calculate the LAPRs of the interleaved codewords from the sources and transmit them to the multiuser detector;
calculate the LAPRs of the messages from the sources and transmit them to the network decoder;
Step 3, the network decoder calculates:
the LAPR of the interleaved codeword from the relay and transmits it to the multiuser detector;
the extrinsic LLRs of the messages from the sources and transmits them to the channel decoder;
the LAPPRs of the (decoded) messages from the sources.

Figure 10:
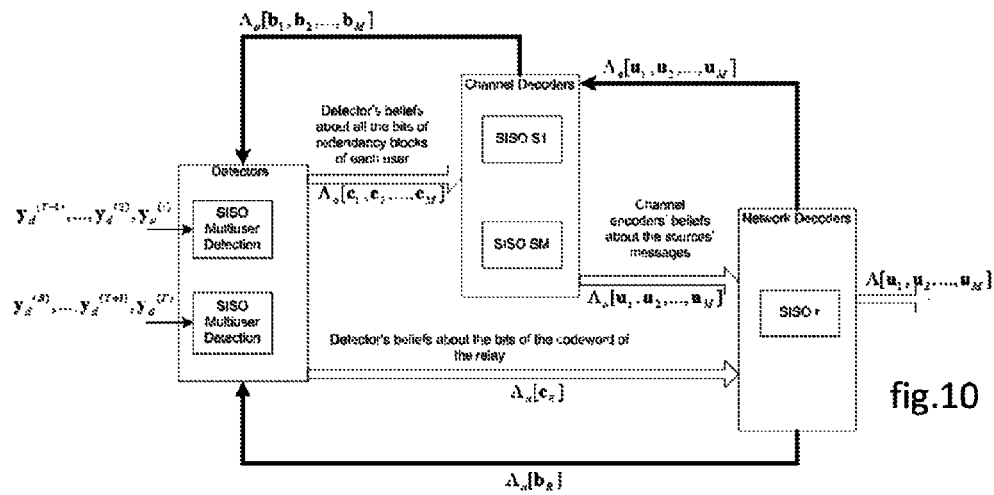
FIGS. 10 and 11 are diagrams of the joint channel-network decoder of the destination of the invention.
Figure 11:
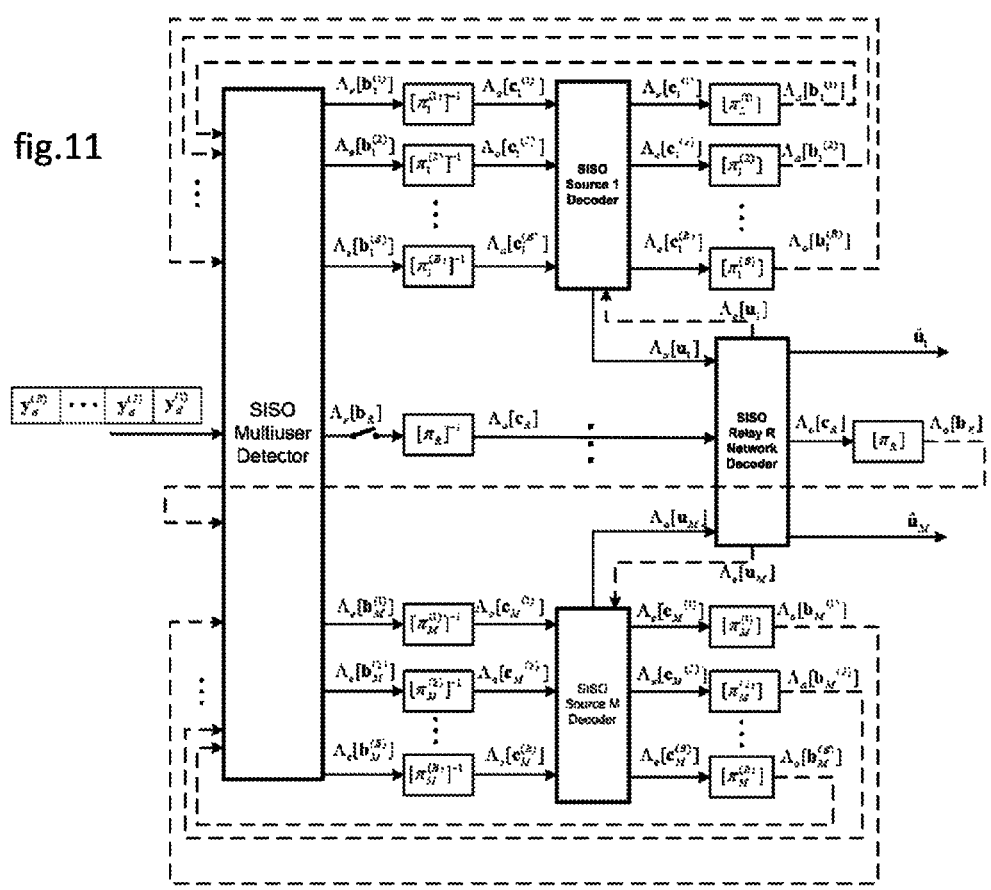

FIG. 11 is a more detailed diagram than FIG. 10 showing the joint channel-network decoder of the destination. This diagram shows a switch (breaker). The switch is closed if and only if the relay is active during the N transmission channel uses, i.e. if it has been able to decode a message without error and forward it. Otherwise, the switch is open and the SISO network decoder is not activated. Under such circumstances, the decoder is no more than a joint multiuser detector (MUD) and decoder.

In an embodiment, the MARC system has a plurality of relays Rj. The operation of the sources is the same regardless of the number L of relays of the MARC system, and this takes account of the incremental redundancy encoding performed by the sources.

Each relay can perform the above-described relaying method while ignoring the signals that might be relayed by the other relays.

In another embodiment of the relays Rj, a relay may take account of the signal(s) already transmitted by one or more other relays, and a relay sends a signal representative of the messages decoded without error not only to the destination D but also to one or more other relays. In this implementation, the relay comprises, with reference to FIG. 2, an iterative joint detection and decoding unit DDU followed by a decision unit DU and then by an encoding and transmission unit ETU. Nevertheless, in comparison with FIG. 2, the joint detection and decoding unit DDU and the encoding and transmission unit ETU have certain particular features.

Figure 12:
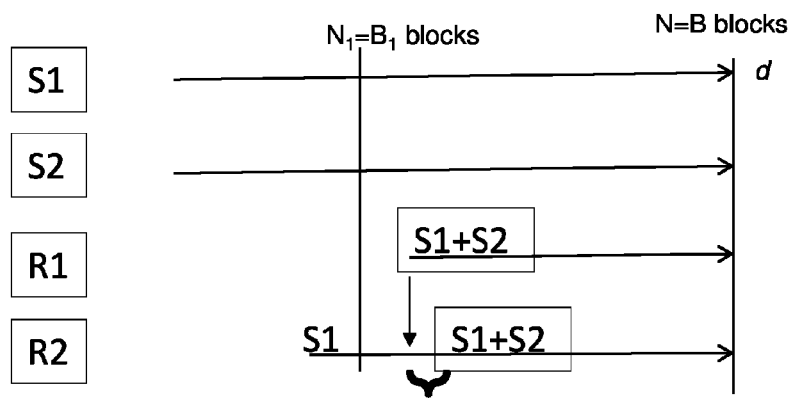
FIG. 12 shows an implementation of a method of the invention in the context of a system with two relays when the relay R2 benefits from the signal transmitted by the relay R1 that has estimated the signals from the two sources S1 and S2 after receiving the block B1.

In order to simplify the description, consideration is given to a MARC system having two relays R1 and R2. For the purposes of illustration, it is assumed that the relays R1 and R2 begin to transmit respectively at the ends of blocks T1 and T2, and that T1≤T2. Such a situation is shown in FIG. 12. In the example shown, the relay R1 decodes the two sources S1 and S2 simultaneously after the switchover threshold B1 and before the relay R2. The relay R1 begins to forward a signal representative of messages from the sources S1 and S2 while the relay R2 has switched to the selective listening stage. If the link between the relay R1 and the relay R2 is of good quality, then the relay R2 can benefit from the signal forwarded by the relay R1. This can enable it to decode both sources during the selective listening stage, whereas in the absence of the signal coming from the relay R1 it would have been able to decode only one of the two sources, the source S1 in the example.

The sequence received by the relay R2 can be written:

$$y_{R_2}^{(b)} = \sum_{i=1}^{M} h_{S_i,R_2} x_{S_i}^{(b)} + n_{R_2}^{(b)}$$

while receiving the blocks b with $b \in \{1, 2, \ldots, T1\}$.

At the end of the block T1, the relay R1 switches to the encoding and forwarding stage. Consequently, the relay R2 begins to receive a signal coming from the relay R1. The sequence received by the relay R2 can be written:

$$y_{R_2}^{(b)} = \sum_{i=1}^{M} h_{S_i,R_2} x_{S_i}^{(b)} + h_{R1,R2} x_{R1}^{(b)} + n_{R_2}^{(b)}$$

while receiving the blocks b with $b \in \{T1, \ldots, T2\}$;
in which expressions $h_{S_i,R2} \in \mathbb{C}$ represents the channel gain between the source Si and the relay R2, $h_{R1,R2} \in \mathbb{C}$ represents the channel gain between the relay R1 and the relay R2, and $n_{R1}^{(b)} \in \mathbb{C}^{N_b}$ and $n_{R2}^{(b)} \in \mathbb{C}^{N_b}$ are noise vectors.

Figure 13:
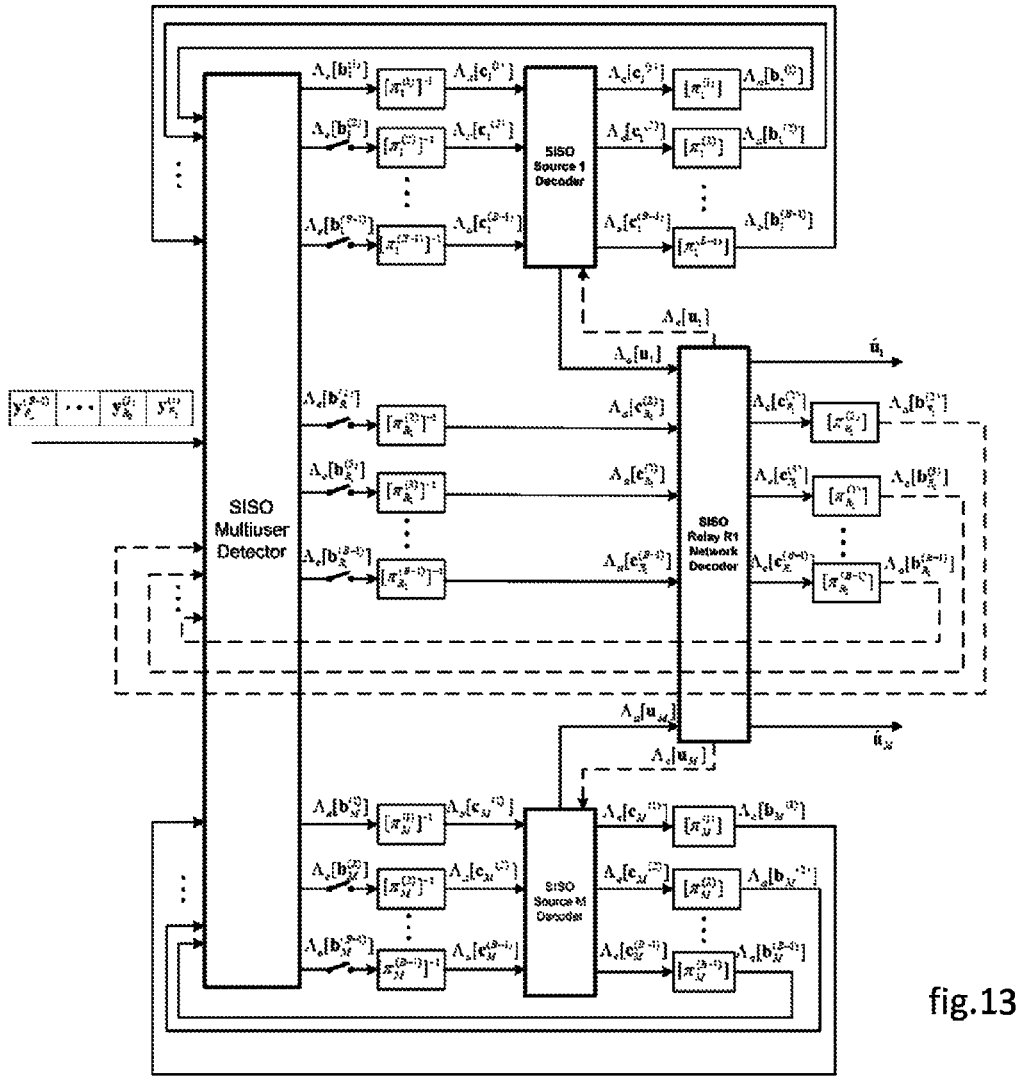
FIG. 13 is a diagram of the DDU unit for iterative joint detection and decoding in a relay of the invention.

The unit DDU for iterative joint detection and decoding of the relay R2 is shown in FIG. 13. The DDU uses all of the previously received blocks up to the current block b: $y_{R_2}^{(1)}$, $y_{R_2}^{(2)}, \ldots, y_{R_2}^{(b)}$ in order to extract the estimate of the messages from the sources $\hat{u}_{S_1}, \hat{u}_{S_2}, \ldots, \hat{u}_{S_M}$. The structure of the DDU and its operation are similar to the structure and the operation of the iterative joint detection and decoding unit of the destination as shown in FIG. 11 for a MARC system having only one relay. With reference to FIG. 13, if the received sequence $y_{R_2}^{(b)}$, $b=1, 2, \ldots, B-1$ contains a signal coming from the relay R1, then the corresponding switch is closed. If one of the switches upstream from the network decoder R1 is closed, then that network decoder R1 is activated.

The decision unit DU functions in the same manner as described above, and it takes a decision on the basis of the decoded messages from the sources. The decision unit DU outputs the source messages that have been decoded without error and that are taken into account by the encoding and transmission unit ETU of the relay after switching from the listening stage to the encoding and forwarding stage.

Figure 14:
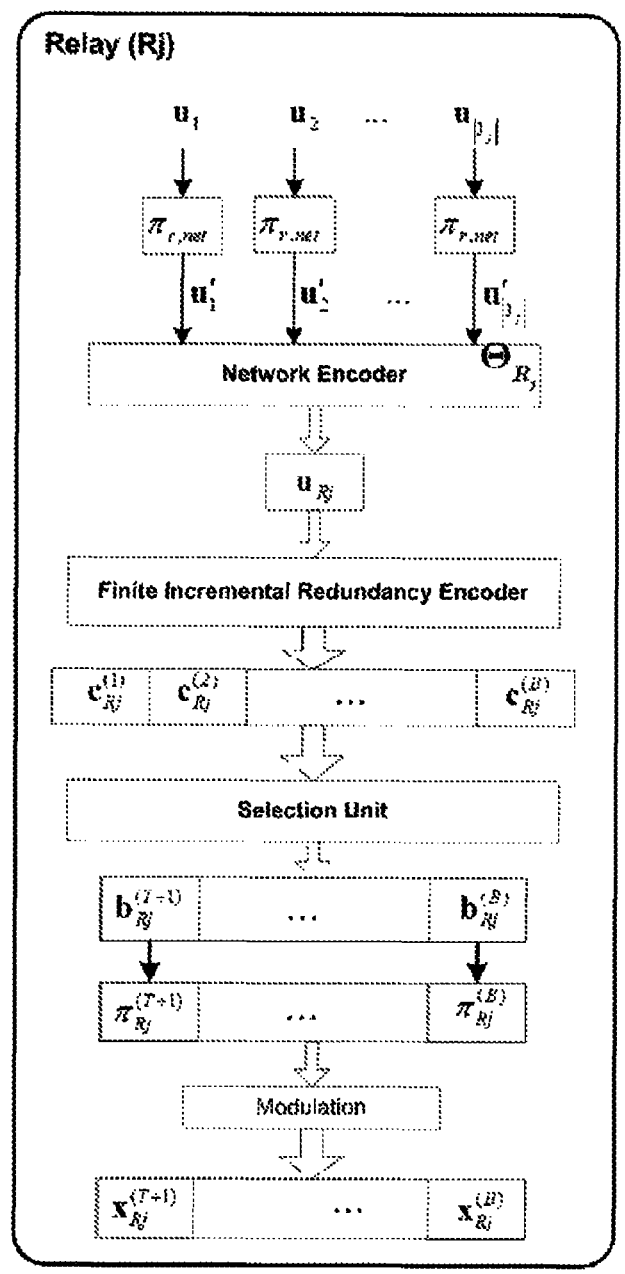
FIG. 14 is a diagram of the encoding and transmission unit ETU of a relay of the invention.

After switching, the ETU as shown in FIG. 14 has as input k information bit messages from each source for which the message has been decoded correctly.

The messages that have been decoded without error are initially interleaved, and then the ETU proceeds with network encoding.

Figure 15:
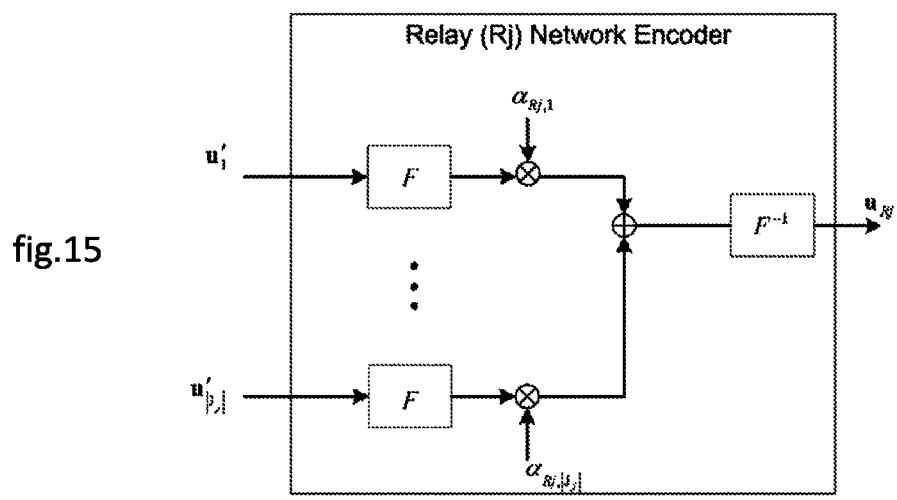
FIG. 15 is a diagram of a network coding function of the encoding and transmission unit ETU of a relay of the invention for a MARC system with a plurality of relays.

Consideration is given to the relay Rj, for j=1 to L, the associated network coding $\Theta_{R_j}$ shown in detail in FIG. 15 is the vector $$a_j = [a_{1,j}\, a_{2,j} \ldots a_{M,j}]^T$$

of dimension M in the q element Galois field GP(q) with q>2. Assume that for a given configuration, this relay detects only J messages without error of indices lying in the set $J_j \subset \{1, \ldots M\}$, then the result of the network encoding in the selective reception mode $u_{R,j}$ is the linear combination $$u_{R,j} = \sum_{i \in J_j} a_{i,j} u'_i$$

with $u'_i$ representing the message from the source i that has been interleaved and decoded without error with $i \in J_j$. This amounts to setting to zero the coefficients $\{a_{i,j}\}_{i \notin J_j}$ of the vector $a_j$ having indices that are not included in the set $J_j$. As a result, it is possible to define effective network encoding for each relay that depends on messages from sources that it has not been possible to detect without error (interruption of the link from the source to the corresponding relay). In this context, nontransmission from a relay is effective network coding that consists in a zero vector of dimension M. Implicitly, the message elements that are detected without error belong to GF(q) that may require converters from the binary field F2 to the field GF(q) and vice versa, written respectively F and $F^{-1}$ in FIG. 15, a converter making log 2(q) bits correspond to a symbol of GF(q). The vectors $u_{R,j}$ may be obtained from the matrix T such that:

$$[\hat{u}'_{S_1}, \ldots, \hat{u}'_{S_M}]^T = [u_{R_1}, \ldots, u_{R_L}]$$

where T is the encoding matrix of dimension M×L associated with the configuration of the link to relay interruptions taken into consideration. When the number Q of source to relay links that are interrupted is less than or equal to L, the network coding is said to have full diversity if and only if the matrix $$G = [I_M\, T]$$

(where $I_M$ is the identity matrix of dimension M) remains of full rank M when L-Q columns are deleted at random. This property is true for any configuration of interruptions if for Q=0 (no source to relay links interrupted) the matrix:

$$G_0 = [I_M\, T_0]$$

represents an MDS code with a minimum distance of L+1. Since Q=0, it follows that $$T_0 = [a_1\, a_2 \ldots a_L].$$

The network code in the non-selective reception mode amounts to nontransmission.

The ETU performs an encoding and modulation scheme similar to that of the sources: incremental redundancy encoding, distinct interleaving per block, modulation. The difference comes from adding a unit for selecting the blocks for transmission as a function of the number of transmission channel uses that remain for transmission from the relay. This selection unit intervenes before interleaving, but it could equally well intervene after interleaving. The encoding module encodes the message $u_{R_j}$ by means of an incremental redundancy code and transforms the message $u_{R_j}$ into $n_{R_j}$ bits written $c_{R_j} \in \mathbb{F}_2^{n_{R_j}}$. The resulting codeword $c_{R_j}$ is segmented into B' redundancy blocks written $c_{R_j}^{(i)} \in \mathbb{F}_2^{n_{R_j,i}}$ with $i=1, 2, \ldots, B'$. Each block comprises $n_{R_j,i}$ bits, with $$n_{R_j} = \sum_{i=1}^{B'} N_{R_j,i}.$$

The incremental redundancy code may be of the systematic type, in which case the information bits are included in the first block: $u_{R_j} \in c_{R_j}^{(1)}$. Regardless of whether or not the incremental redundancy code is of the systematic type, it is such that the first block $c_{R_j}^{(1)}$ from among the B' blocks can be decoded independently of the other blocks. The highest coding rate is $k/n_{R_j,1}$ and it cannot be greater than one, $n_{R_j,1} \geq k$. The minimum rate for the relay R is $k/n_{R_j}$. Each block $\{c_{R_j}^{(i)} : 1 < i \leq B'\}$ after the first block includes parity bits that add redundancy to the first block, each of the blocks $\{c_{R_j}^{(i)} : 1 < i \leq B'\}$ being capable of being decoded jointly with the blocks 1 to i-1.

Each code $c_{R_j}^{(i)}$ is interleaved by a distinct interleaver written $\pi_{R_j}^{(i)}$. The interleavers serve to combat fading, which may occur during transmission via the channel, and to give the relay a fingerprint that makes the sources and the relay easier to separate by the destination.

The unit for selecting the blocks for forwarding selects the blocks that can be forwarded given the number of transmission channel uses that remain. Assuming that the relay switches from the listening stage to the encoding and forwarding stage after receiving the block T, then there remain B-T transmission channel uses for transmission from the relay. The blocks selected after interleaving are given indices T+1 to B': $b_{R_j}^{(T+1)}, \ldots, b_{R_j}^{(B')}$, the corresponding codeword is written $b_{R_j} = [b_{R_j}^{(T+1)}, \ldots, b_{R_j}^{(B')}]$.

Each selected portion $b_{R_j}^{(i)}$ is modulated in order to obtain a complex codeword $x_{R_j} = [x_{R_j}^{(T+1)}, \ldots, x_{R_j}^{(B')}]$ with $x_{R_j}^{(i)}$ $\in \chi^{N_i}$, i=T+1, ..., B' where $X \subset \mathbb{C}$ designates a complex signal of cardinal number $|\chi|=2^{q_{R_j}}$ and where $N_i=n_{R_j,i}/q_{R_j}$, $q_{R_j}$ being the modulation order.

The relay transmits the codeword $x_{R_j}=[x_{R_j}^{(T+1)}, \ldots, x_{R_j}^{(B')}]$ made up of B' blocks during B'≤B−T uses of the transmission channel. Each block is itself a codeword since it comes from the incremental redundancy encoder.

REFERENCES

[1] C. Hausl, F. Schrenckenbach, I. Oikonomidis, G. Bauch, "Iterative network and channel coding on a Tanner graph," Proc. Annual Allerton Conference on Communication, Control and Computing, Monticello, Ill., 2005.
[2] C. Hausl, P. Dupraz, "Joint Network-Channel Coding for the Multiple-Access Relay Channel," Proc. IEEE SECON '06, Reston, Va., September 2006.
[3] S. Yang, R. Koetter, "Network coding over a noisy relay: A belief propagation approach", Proc. IEEE ISIT '07, Nice, France, June 2007.
[4] L. Bahl, J. Cocke, F. Jelinek, and J. Raviv, "Optimal Decoding of Linear Codes for minimizing symbol error rate", IEEE Transactions on Information Theory, vol. IT-20(2), pp. 284-287, March 1974.

APPENDIX

LLR: "Log Likelihood Ratio"
For U being a random binary variable, its log likelihood ratio (LLR) is defined by the following relationship:

$$LLR_u = \log\left(\frac{P_U(u=1)}{P_U(u=0)}\right)$$

in which relationship $P_U(u)$ denotes the probability that the random variable U takes the value u.
LAPPR: "Log A Posteriori Probability Ratio"
Represents the LLR conditional on an observation that generally corresponds to a received signal.

$$LAPPR_u = \log\left(\frac{P(u=1|y)}{P(u=0|y)}\right)$$

Although the present disclosure has been described with reference to one or more examples, workers skilled in the art will recognize that changes may be made in form and detail without departing from the scope of the disclosure and/or the appended claims.

The invention claimed is:

1. A relaying method performed by a half duplex relay for a telecommunications system comprising a plurality of sources, the relay, and a destination, the method comprising the following acts performed by the half duplex relay:
   a reception stage of receiving from a transmission channel in the telecommunications system successive codewords transmitted by the sources during N uses of the transmission channel, the successive codewords transmitted by a source corresponding to B blocks, the first of which can be decoded independently of the other blocks, the reception stage including a decoding step of estimating a message from each source on the basis of the received codewords, the message being associated with the codewords transmitted by the source;
   an error detection and decision-taking step performed by the relay on messages that are decoded in the decoding step without error; and
   a stage of encoding a signal and transmitting the signal to the destination in the telecommunications system, wherein the signal is representative of only those messages that have been decoded without error;
   such that the relay passes from non-selective reception to selective reception after receiving B1 blocks and switches from the reception stage to the encoding and forwarding stage under the control of the error detection and decision step, where 1≤B1<B−1, B>2, thereby making the half duplex relay dynamic.

2. The method according to claim 1, wherein the sources transmit simultaneously over a same radio resource, and the decoding step is iterative and comprises joint detection and joint decoding.

3. The method according to claim 1, wherein among the B blocks transmitted successively by a source, and accumulation of blocks from 1 to b is a codeword of a code of coding rate that decreases with b, 1≤b≤B.

4. The method according to claim 3, wherein the incremental redundancy code is a punctured turbo code of variable coding rate.

5. The method according to claim 3, wherein the incremental redundancy code is a punctured convolutional code of variable coding rate.

6. The method according to claim 3, wherein the incremental redundancy code is an LDPC code of variable coding rate.

7. The method according to claim 1, wherein the encoding and forwarding stage comprises network encoding which is a non-bijective surjective function applied to the messages that are decoded without error.

8. The method according to claim 7, wherein the non-bijective surjective function is an exclusive-or of the messages decoded without error.

9. The method according to claim 1, wherein when the decision concerning messages decoded without error occurs after the $T^{th}$ use of the channel then the relay determines a modulation order $q_r$ and a channel encoding length $n_r$ used by the encoding and forwarding stage that satisfy the following equation:

$$n_r = q_r\left(N - \sum_{i=1}^{T} N_i\right)$$

with $N_i$ being the first T channel uses from among the N successive transmission channel uses.

10. The method according to claim 1, wherein the step of detecting error and deciding on messages that have been decoded without error is performed by means of a CRC type code.

11. The method according to claim 1, wherein the encoding and forwarding stage comprises channel encoding such that the channel encoded codeword is interleaved per block, each block of the codeword being interleaved by an interleaver that is distinct among the blocks, and wherein the encoding and forwarding stage further comprises selecting blocks from among the codeword blocks after interleaving in order to adapt the length of the codeword for forwarding to the number of channel uses that remain after the relay has switched from the reception stage to the encoding and forwarding stage.

12. A half-duplex relay for a telecommunications system comprising a plurality of sources, the relay, and a destination, for performing a relaying method, wherein the half duplex relay comprises:
- decoder means for receiving from a transmission channel in the telecommunications system successive codewords transmitted by the sources during N uses of the transmission channel, the successive codewords transmitted by a source corresponding to B blocks, of which the first can be decoded independently of the other blocks, and estimating a message from each source on the basis of the received codewords, wherein the message is associated with the codewords transmitted by the source;
- encoding and forwarding means for encoding a signal and transmitting the signal to the destination in the telecommunications system, wherein the signal is representative of only those messages that have been decoded without error;
- decision means for deciding which messages have been decoded without error in order to cause the relay to pass from non-selective reception to selective reception after receiving B1 blocks; and
- a switch which switches messages that have been decoded without error to the encoding and forwarding means, where $1 \leq B1 < B-1$, $B > 2$, thereby making the half duplex relay dynamic.

13. The relay according to claim 12, wherein the encoding and forwarding means comprise modulator means and channel encoding means, and wherein when the decision means decide to change over after the $T^{th}$ use of the channel, then the relay determines a modulation order $q_r$ for the modulation means and a channel encoding length $n_r$ for the channel encoding means that satisfy the following equation:

$$n_r = q_r \left( N - \sum_{i=1}^{T} N_i \right)$$

with $N_i$ being the first T channel uses from among the N successive channel uses.

14. A non-transitory computer-readable data medium including program instructions stored thereon and adapted to perform a method of relaying a digital signal, when said program is loaded and executed in a half duplex relay for a telecommunications system comprising a plurality of sources, the half duplex relay, and a destination, wherein the instructions configure the half duplex relay to perform the method, which comprises:
- a reception stage of receiving from a transmission channel in the telecommunications system successive codewords transmitted by the sources during N uses of the transmission channel, the successive codewords transmitted by a source corresponding to B blocks, the first of which can be decoded independently of the other blocks, the reception stage including a decoding step of estimating a message from each source on the basis of the received codewords, the message being associated with the codewords transmitted by the source;
- an error detection and decision-taking step performed by the relay on messages that are decoded in the decoding step without error; and
- a stage of encoding a signal and transmitting the signal to the destination in the telecommunications system, wherein the signal is representative of only those messages that have been decoded without error;
- such that the relay passes from non-selective reception to selective reception after receiving B1 blocks and switches from the reception stage to the encoding and forwarding stage under the control of the error detection and decision step, where $1 \leq B1 < B-1$, $B > 2$, thereby making the half duplex relay dynamic.

\* \* \* \* \*